Oct. 26, 1948.  R. T. HOSKING  2,452,192
LOCK NUT

Filed May 10, 1944  2 Sheets-Sheet 1

Inventor
Richard T. Hosking
by Parker & Carter
Attorneys.

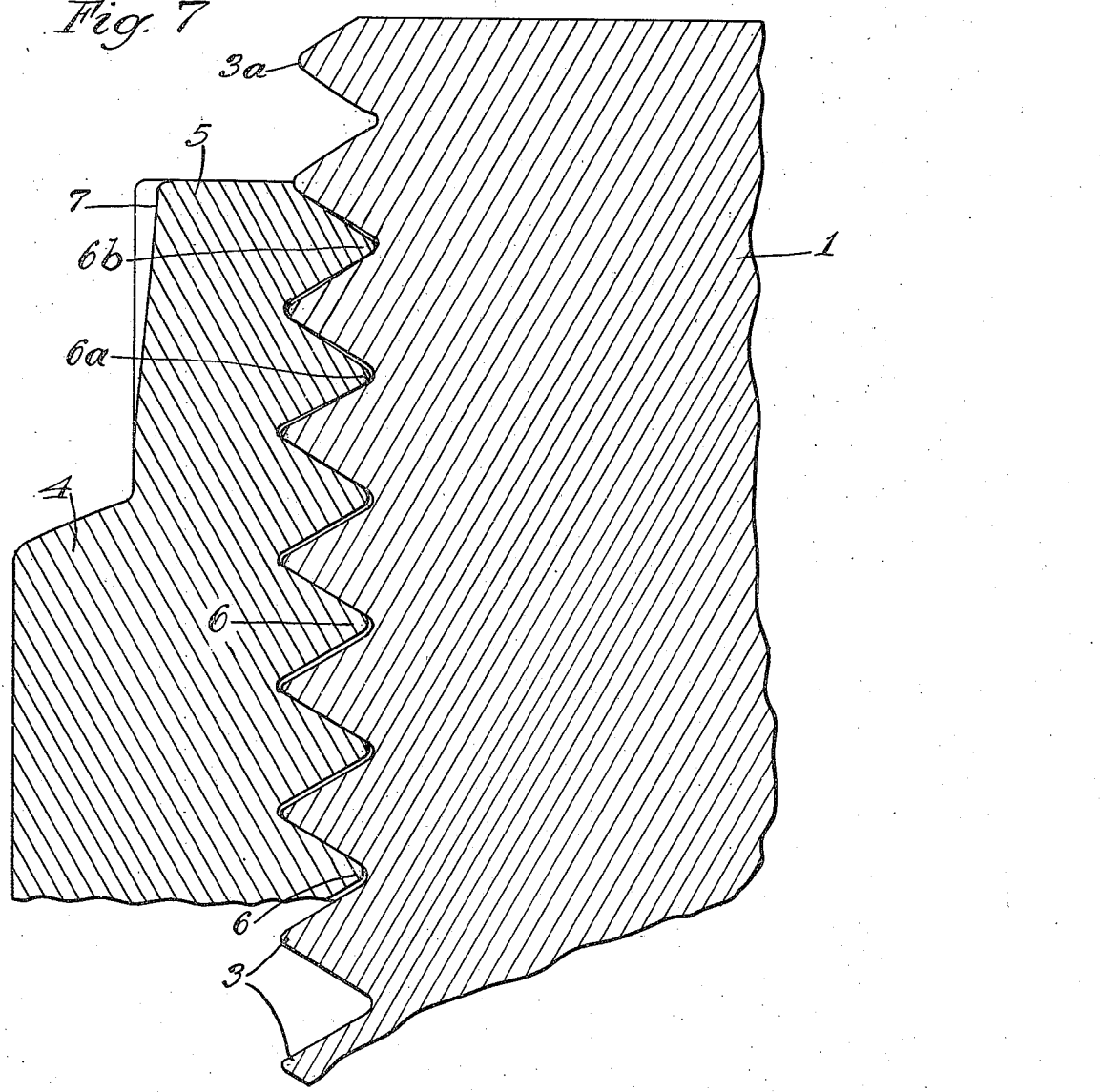

Patented Oct. 26, 1948

2,452,192

UNITED STATES PATENT OFFICE 2,452,192

LOCK NUT

Richard T. Hosking, Chicago, Ill.

Application May 10, 1944, Serial No. 534,884

2 Claims. (Cl. 151—21)

1

My invention relates to an improvement in lock nuts and has for one purpose to provide a lock nut which, when screwed down on a bolt, or similar element, will hold firmly and will not become unintentionally loosened.

Another purpose is to provide a lock nut which includes tool elements effective to change the contour of the bolt threads which they engage, in order to lock the nut in place by the displacement of some of the bolt threads in relation to other bolt threads, the nut being in simultaneous engagement with both the original bolt threads and the changed or distorted bolt threads.

Another purpose is to provide a lock nut which constitutes a tool or rolling means for distorting or varying the thread contour of part of the bolt threads engaged by the nut.

Another purpose is to provide a lock nut which maintains itself in accurate alignment with the axis of the bolt to which it is applied.

Another purpose is to provide an improved method of forming lock nuts.

Another purpose is to provide a lock nut having an integral, resilient locking portion.

Other purposes will appear from time to time in the course of the specification and claims.

I illustrate the invention more or less diagrammatically in the accompanying drawings, wherein:

Figure 7 is a detailed radial section, on an enlarged scale, showing the nut in the process of deforming the bolt.

Like parts are indicated by like symbols throughout the specification and drawings.

Figure 1:
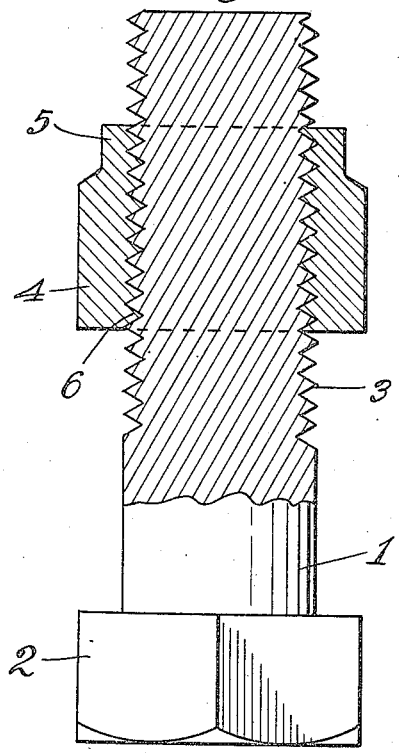
Figure 1 is a view, with parts in axial section, illustrating a bolt carrying a nut formed without the use of my invention.
Figure 2:
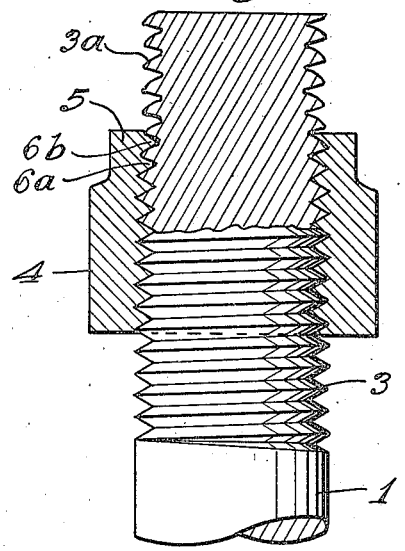
Figure 2 is a similar view illustrating the effect of my lock nut on the thread of a bolt.

Referring to the drawings I generally nidicates any suitable bolt, having a head 2. 3 indicates the thread of the bolt.

With reference particularly to Figure 1, 4 indicates any suitable nut body having a relatively resilient extension 5, of reduced outside diameter. There is no modification of the threads

2

6 of the nut, as my invention is not illustrated in Figure 1.

Referring to the nut shown in Figures 2 to 5, the nut body 4 may be of the usual hexagonal form. The locking extension 5 is shown as having a generally cylindrical exterior 5a. The material of which the nut is made is such that the relatively thin walled locking portion 5, and its thread, has some measure of resilience.

Figure 3:
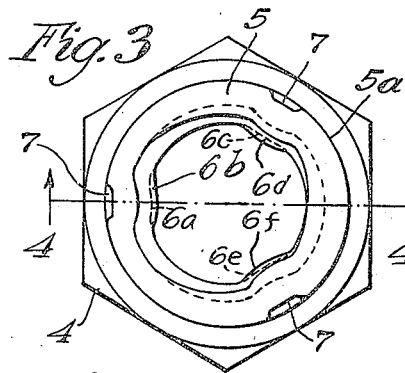
Figure 3 is a plan view of a nut made in accordance with my invention.
Figure 4:
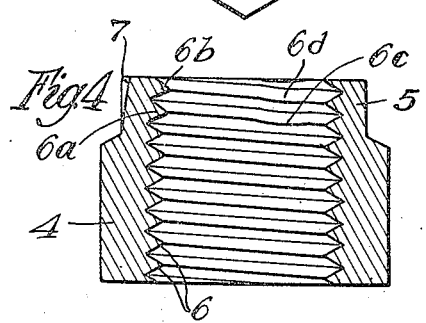
Figure 4 is a section on line 4—4 of Figure 3.
Figure 5:
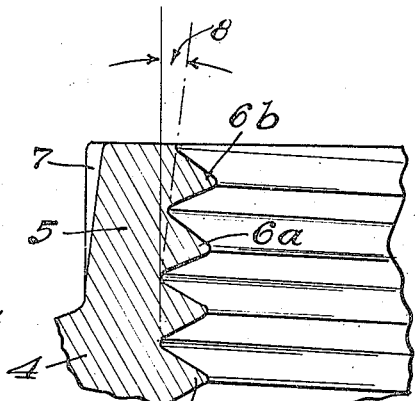
Figure 5 is a partial radial section, on an enlarged scale, illustrating one method of forming the lock nut.

Referring to the detailed showing of Figures 3, 4 and 5, I direct an inward thrust against three points spaced about the exterior of the locking portion 5, which causes the formation of three circumferentially spaced exterior indentations 7. These may be made, for example, by thrusting any suitable tool or tools, having inclined converging faces, downwardly against the outer surface 5a of the portion 5 of the nut. Each resulting indentation causes an inward displacement of a part of the member 5. This in turn displaces part of the thread inwardly through an arc indicated at 8 in Figure 5. As a result, parts of the normal thread 6 are moved inwardly toward the axis of the nut as at 6a, 6b, 6c, 6d, 6e and 6f. At the same time these particular inwardly distorted areas are moved somewhat downwardly toward the opposite end of the nut. Each of these small downward and inward projections constitutes a tool. Each such tool is separated from the adjacent tools by an undistorted part of the locking portion 5 of the nut, and of the threads of the nut, of substantial arcuate extent. While I might space these tool elements in a variety of ways, and vary their number, I find it advantageous to distort the nut at three uniformly spaced areas, as shown in Figure 3. Three sets of tools are thus formed, uniformly spaced about the axis of the nut. That is to say, in the form of the device as shown in Figures 2 to 6, six separate tools, 6a to 6f inclusive, are arranged, two in each of three positions about the axis of the nut.

When the nut is screwed down about a bolt or any equivalent threaded member, the undistorted threads of the nut body 4 cooperate with the bolt threads in the usual manner. But when the locking portion 5 of the nut reaches the end of the bolt, the tools 6a to 6f inclusive are effective to distort the thread, as they pass over it, to produce a deformation or change in contour which is illustrated at 3a in Figure 2. This causes an endwise thrust of the nut against the undistorted threads of the bolt. This distortion produces a clamping action of the undistorted nut threads against the bottoms of the lower threads of that part of the bolt which is surrounded by the nut body 4. Thus, the tops of the lower threads of the nut, using the term "lower" to mean the advancing end of the nut, are drawn up against the bottom surfaces of the bolt threads to which they are opposed. The deforming tools 6a to 6f actually distort the bolt threads which they contact, and create a leverage which tends to pull the nut upwardly along the bolt. This distorting action is limited to a small number of turns at the top of the nut, and consequently most of the bolt threads engaged by the nut are not deformed.

Since the thread of the nut, at each one of the tool positions, has been distorted or deformed toward the undistorted end of the nut, there is a bodily offsetting of the distorted thread, which may extend from root to crest, particularly in the upper three tools, but which is most marked at the crest. Therefore, the crest of the distorted or tool portion of the nut threads, at any one of the positions 6a to 6f, when the nut is tightened up on a bolt, correspondingly distorts the bolt thread to which it is opposed. This distortion of the bolt thread from its original form cramps the metal of the bolt threads against the metal of the nut threads, and creates a pressure relationship which makes it difficult to remove the bolt, and which renders the unintended removal or loosening of the bolt practically impossible.

I find it advantageous to space the tools about 120 degrees apart about the axis of the nut. They provide, when so spaced, a 3-point support which automatically aligns the axis of the nut with the axis of the bolt and insures that when the nut is drawn down against a surface through which the bolt passes, or from which the bolt extends, the bottom of the nut is precisely parallel with the surface, if such surface is perpendicular to the axis of the bolt.

Figure 6:
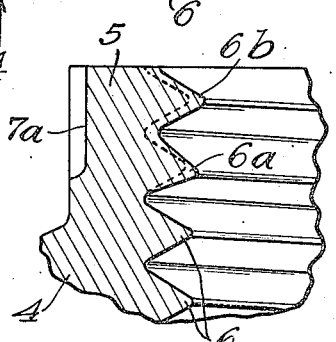
Figure 6 is a similar view illustrating another method of forming the lock nut.

Referring to Figure 6, the external depression 7a is shown as it will appear if caused by a tool moving radially inwardly toward the axis of the nut and in a plane perpendicular to said axis. The formation of the tool elements 6a and 6b is substantially the same as in Figure 5, as the connection between the undistorted and the distorted parts of the nut create in effect a pivoting action equivalent to that caused by the downward thrust of the inclined faces or converging tools used to form the nut shown in Figure 5.

I find that I can obtain a substantial locking effect without substantial distortation of the bolt threads, by increasing the arcuate extension of the distorted portions of the nut. This is done simply by employing wider tools than those which are employed to make the relatively narrow depressions shown at 7 in Figure 3.

It will be realized that whereas I have described and claimed a practical and operative device and method, nevertheless many changes may be made without departing from the spirit of my invention. I therefore wish my description and drawings to be taken as in a broad sense illustrative or diagrammatic, rather than as limiting me to my precise showing.

The use and operation of my invention are as follows:

The nut I employ includes the usual body 4, of substantial radial thickness, and the integral, thin and relatively resilient locking portion 5. The above described tool forming distortation creates, in the resilient portion 5, a plurality of circumferentially spaced rolling tools 6a, 6b. It will be understood that I may provide a single tool at each position, but it is not disadvantageous, in use, and is easier in manufacture, to provide an external indentation 7 or 7a of such length that two or more of such tools are formed at each position since the indentation overlaps two or more turns of the thread. The main tool, however, is the top tool 6b, which extends most deeply into the bolt receiving aperture.

The provision of three tools or tool areas spaced about the nut provides a three-point contact between the nut and the threads of the bolt which is effective to align the axis of the nut with the axis of the bolt. This maintains the bottom of the nut precisely parallel with the surface from which the bolt extends, if that surface is perpendicular to the axis of the bolt. Thus the nut can be rotated into locking engagement with a plane surface without scratching or marring the surface to any damaging degree.

In the locking effect, the provision of the tool areas in that part of the nut which is radially thin, provides a resilient locking action. The thin portion 5 is thin enough to be definitely resilient. The portions of the threads extending between the individual tool elements also have a certain resilience. Where the arcuate extension of the indentations 7 or 7a is largely increased, and the intervening undistorted thread is reduced in arcuate length, the thread may not be effective to act as a tool, to roll the thread of the bolt, but the distortion will still be effective to maintain a resilient locking effect which prevents unintended loosening of the nut. And the nut alignment, or three point support, is still maintained.

In forming the lock nuts made in accordance with my invention, I find it advantageous to provide the nut body 4 with the relatively resilient relatively thin walled locking extension 5. I thread the nut, providing it with a thread of uniform and continuous pitch throughout the length of the nut and its locking extension 5. Thereafter I modify or distort the portion 5 by thrusting it inwardly at preferably, three circumferentially spaced points. I may form the nut as shown in Figures 3 to 5 by moving downwardly against the exterior of the portion 5 a tool or tools having upwardly converging inner surfaces, the individual tool elements being so spaced about the axis of the nut that the three converging members force the metal of the portion 5 inwardly to form the depressions 7. It may be advantageous to have the nut body 4 serve as a stop for ending the downward forming movement of the tools, or their forming movement may be otherwise limited.

To form the nut of Figure 6 I may employ three tools which are moved preferably in lines or planes radial to the axis of the nut. The three tools are moved in unison inwardly against the surface of the portion 5 of the nut.

The result of either one of the above two portions is to form the thread rolling tools 6a, 6b.

I claim:

1. In combination with a threaded bolt, a nut threaded thereon, having a relatively thin-walled extension extending from the body thereof parallel with the axis of and interiorly threaded to engage the bolt, a plurality of angularly spaced indentations in the outer wall of the extension, increasing in depth axially from their initial point adjacent the body of the nut toward their greatest depth at the outer end of the extension, the threads on the interior of the extension being inwardly displaced in radial alignment with each indentation, a distance substantially equal to the radial depth of the corresponding part of the indentation.

2. In combination with a threaded bolt, a nut threaded thereon, having a relatively thin-walled extension extending from the body thereof parallel with the axis of and interiorly threaded to engage the bolt, a plurality of angularly spaced indentations in the outer wall of the extension, increasing in depth axially from their initial point adjacent the body of the nut toward their greatest depth at the outer end of the extension, the threads on the interior of the extension being inwardly displaced in radial alignment with each indentation, a distance substantially equal to the radial depth of the corresponding part of the indentation, the inwardly displaced parts of the threads being downwardly distorted toward the body of the nut, the degree of downward distortion increasing in proportion with increase of the depth of the indentation.

RICHARD T. HOSKING.

REFERENCES CITED

The following references are of record in the file of this patent:

UNITED STATES PATENTS

| Number | Name | Date |
|---|---|---|
| 2,314,780 | Gade | Mar. 23, 1943 |
| 2,352,668 | Tripp | July 4, 1944 |
| 2,355,253 | Whitfield | Aug. 8, 1944 |

FOREIGN PATENTS

| Number | Country | Date |
|---|---|---|
| 215,727 | Switzerland | Oct. 1, 1941 |